US 8,195,809 B2

(12) United States Patent
Langan et al.

(10) Patent No.: US 8,195,809 B2
(45) Date of Patent: Jun. 5, 2012

(54) MULTIGAME MULTIPLAYER PARTY SESSION

(75) Inventors: Thomas A. Langan, Seattle, WA (US); Vipul Vijay Hingne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 12/395,930

(22) Filed: Mar. 2, 2009

(65) Prior Publication Data

US 2010/0222147 A1    Sep. 2, 2010

(51) Int. Cl.
*G06F 15/16* (2006.01)
*G06F 17/00* (2006.01)

(52) U.S. Cl. .......................................... 709/227; 463/42
(58) Field of Classification Search ................... 709/201, 709/204, 227, 230–232; 463/42, 43
See application file for complete search history.

(56) References Cited

U.S. PATENT DOCUMENTS

| 5,630,757 | A | 5/1997 | Gagin et al. | |
| 7,240,093 | B1 | 7/2007 | Danieli et al. | |
| 7,849,212 | B2 * | 12/2010 | Teicher | 709/238 |
| 2005/0071481 | A1 * | 3/2005 | Danieli | 709/229 |
| 2006/0287096 | A1 * | 12/2006 | O'Kelley et al. | 463/42 |
| 2006/0287099 | A1 * | 12/2006 | Shaw et al. | 463/42 |
| 2008/0280683 | A1 | 11/2008 | Nakaji | |

FOREIGN PATENT DOCUMENTS

WO    2008049871 A1    5/2008

OTHER PUBLICATIONS

Zimmerman, et al., "Constructing Client-Server Multi-Player Asynchronous Networked Games using a Single-Computer Model", Retrieved at <<http://www.tffenterprises.com/~dmz/publications/conference/asyncnetgames.pdf>>, Aug. 1, 1997, pp. 1-17.
Ozymandias, "Co-op Game Bill of Rights: 2008 Edition", Retrieved at http://ozynnandias.com/archive/2008/03/17/co-op-game-bill-of-rights-2008-edition.aspx>>, Mar. 17, 2008, pp. 8.
"Grand Theft Auto IV Multiplayer Hands-On (PS3, Xbox 360) by GameTap", Retrieved at http://psp3d.com/games/15078-grand-theft-auto-iv-multiplayer-hands-playstation-3-xbox-360-gametap.html, Apr. 17, 2008, pp. 5.
Smakus, "GTA IV Multiplayer is Great . . . When it Works.", Retrieved at http://trustyganner.com/tg/home/game-reviews/gta-iv-multiplayer-is-great-when-it-works/, May 5, 2008, pp. 6.
"About NetSprocket", Retrieved at http://developer.apple.com/DOCUMENTATION/mac/Sprockets/ GameSprockets-230.html, Jul. 2, 1996, pp. 6.

* cited by examiner

*Primary Examiner* — Yemane Mesfin
(74) *Attorney, Agent, or Firm* — Alleman Hall McCoy Russell & Tuttle LLP

(57) ABSTRACT

A computing device for executing multiplayer game software applications playable with one or more remote peers, the computing device may include a multigame party module that is configured to create a party session that is joinable by the one or more remote peers, the party session may be hosted by the multigame party module. The multigame party module may be configured to establish a peer-to-peer connection between the computing device and a peer computing device of a remote peer in response to a request from a remote peer to join the party session, and place one or more selected party session members into a first game session of a first multiplayer game software application.

19 Claims, 3 Drawing Sheets

MULTIGAME MULTIPLAYER PARTY SESSION

BACKGROUND

Multiplayer computer gaming allows people who are physically separated to interact with each other in a virtual environment. A multiplayer game may be played by a group of people that enter a game session. The same group of people may play multiple game sessions for the multiplayer game. After a period of playing the current multiplayer game, the group of people may desire to play a different multiplayer game. However, using current technologies, it can be a frustrating and time consuming task to migrate the same group of people from the current multiplayer game to a new multiplayer game.

For example, the group of people would have to agree upon a different multiplayer game before ending the current game session, since the group of players would lose communication capabilities upon ending the current game session. Next, each person would have to insert the game disc or launch the new multiplayer game. One person would have to navigate to the multiplayer menu and start a new game session. Furthermore, that person would have to invite each person of the group to play the new game session, which can be a challenge where the identity of members is difficult to determine. For example, the initiating person might have to traverse a friends list of his own, or a friends list of a friend, to find and invite each member. In some cases, the initiating person may have to remember and manually input the gamer identification of a player who is not on such friend lists. This process can be time consuming and may result in some people of the group losing interest and turning off the multiplayer game in favor of doing something else. By the time everyone is invited to the new game session only some of the group of people may continue to play the multiplayer game resulting in an unsuccessful transition of the group one multiplayer game to another multiplayer game.

SUMMARY

Accordingly, various embodiments related to forming a party of people that can move from one game to another game in an efficient manner while keeping the party intact are disclosed herein. For example, one disclosed embodiment provides a computing device for executing multiplayer game software applications playable by one or more people. The computing device may include a multigame party module that creates a party session. The party session may be joinable by one or more remote peers. The multigame party module may establish a peer-to-peer connection between the computing device and a peer computing device of a remote peer in response to a request from a remote peer to join the party session. Furthermore, the multigame party module places one or more selected party session members into a first game session of a first multiplayer game software application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to a computing system in which peer-to-peer (p2p) connections may be established between a plurality of peer computing devices in order for users to play various multiplayer game software applications. Each peer computing device may include software services configured to create a party session that allows a group of peers to move from one multiplayer game software application to another multiplayer game software application while keeping the group intact in order to continue to play together.

Figure 1:
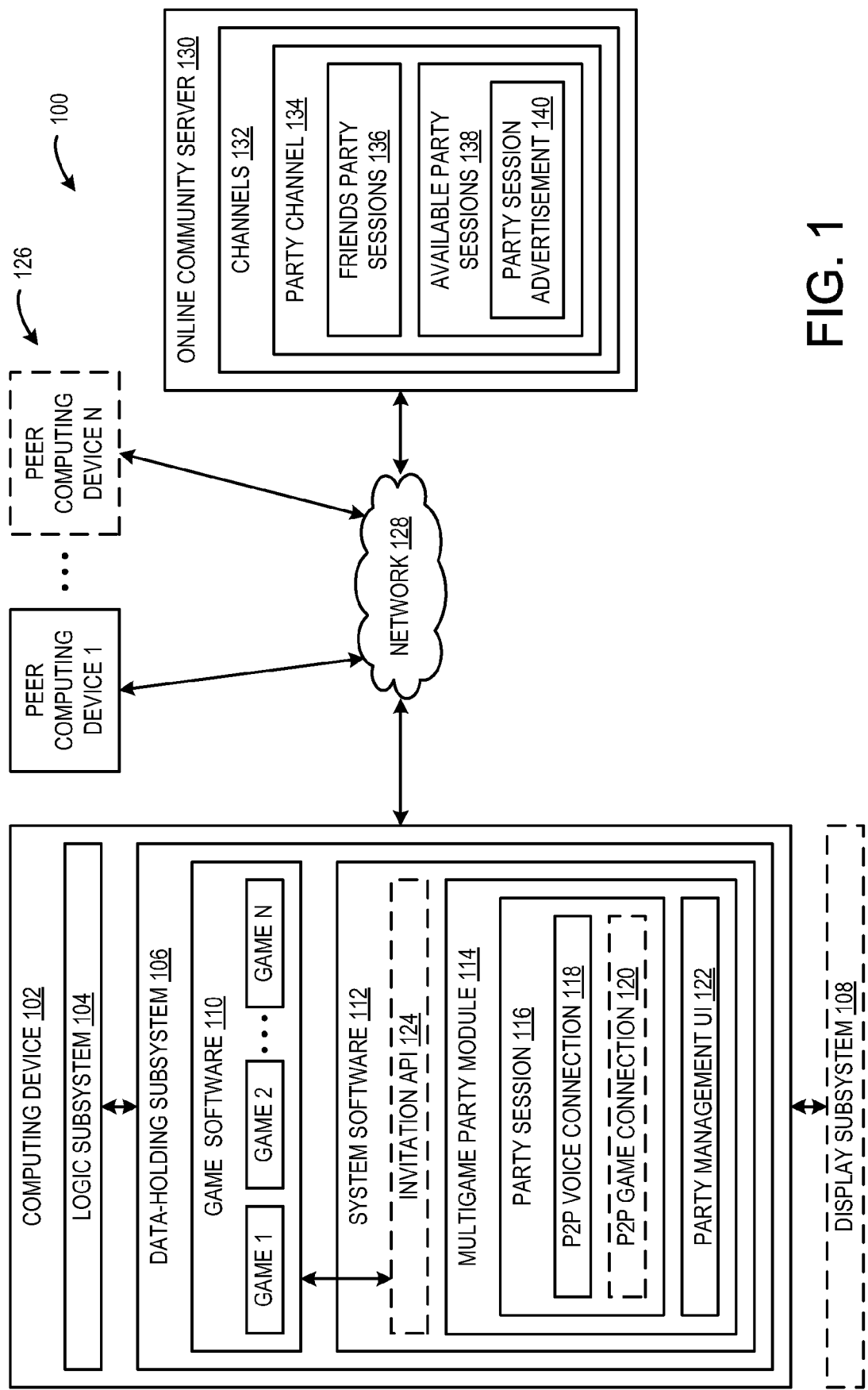
FIG. 1 is a schematic diagram of an embodiment of a computing system in which a party session may be created.

FIG. 1 illustrates a computing system 100 that includes a plurality of peer computing devices (i.e., computing device 102, peer computing device 1 . . . computing device N) 126 that may establish p2p connections with one another via network 128 to play multiplayer games. As an example, computing device 102 is expanded to show components that may be included in a typical computing device of computing system 100. The computing device 102 may include a logic subsystem 104 and a data-holding subsystem 106. Computing system 100 may optionally include a display subsystem 108 and/or other components not shown in FIG. 1.

Logic subsystem 104 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 106 may include one or more physical devices configured to hold data and/or instructions executable by the logic subsystem to implement the herein described methods and processes. When such methods and processes are implemented, the state of data-holding subsystem 106 may be transformed (e.g., to hold different data). Data-holding subsystem 106 may include removable media and/or built-in devices. Data-holding subsystem 106 may include optical memory devices, semiconductor memory devices, and/or magnetic memory devices, among others. Data-holding subsystem 106 may include devices with one or more of the following characteristics: volatile, nonvolatile, dynamic, static, read/write, read-only, random access, sequential access, location addressable, file addressable, and content addressable. In some embodiments, logic subsystem 104 and data-holding subsystem 106 may be integrated into one or more common devices, such as an application specific integrated circuit.

When included, display subsystem 108 may be used to present a visual representation of data held by data-holding subsystem 106. As the herein described methods and processes change the data held by the data-holding subsystem, and thus transform the state of the data-holding subsystem, the state of display subsystem 108 may likewise be transformed to visually represent changes in the underlying data. Display subsystem 108 may include one or more display devices utilizing virtually any type of technology. Such display devices may be combined with logic subsystem 104 and/or data-holding subsystem 106 in a shared enclosure, or such display devices may be peripheral display devices.

Continuing with FIG. 1, data-holding subsystem 106 may include game software 110 and system software 112. Game software 110 may include one or more game software applications that may be executable by logic subsystem 104 to generate a user interface with which one or more users may interact with and be provided with a game experience that includes audio, visual, and/or haptic feedback. In some cases, one or more game software applications of game software 110 may be stored on computer-readable removable media (e.g., optical disk) included in data-holding subsystem 106. Further, in some cases, one or more game software applications of game software 110 may be stored in data storage (e.g., a hard drive) included in data-holding subsystem 106.

One or more of the game software applications may be multiplayer games that may be played by a plurality of peers. One or more of the plurality of peers may play the multiplayer game locally on computing device 102. Further, one or more of the plurality of peers may be remote peers that play the multiplayer game remotely on one or more of the plurality of peer computing devices 126. The system software 112 may be configured to establish a p2p connection with a peer computing device of each of the plurality of peers via network 128 in response to the user of computing device 102 joining a game session of the multiplayer game. Network 128 may include local communication technologies (e.g., local area network (LAN), intranet, etc.) and/or remote communication technologies (e.g., wide area network (WAN), Internet, etc.)

Furthermore, system software 112 may be configured to provide functionality associated with operation of computing device 102 and interaction with game software 110. For example, system software 112 may be configured to launch a game software application, adjust computing device settings, establish a connection with an online community, play media content, download media content or perform virtually any other suitable computing task, etc.

As discussed above, a plurality of peers may play one or more of a variety of different multiplayer games. When the plurality of peers transition from a first multiplayer game to a second multiplayer game, it may be time consuming for the plurality of peers to agree upon a selected game and then migrate to that game in such a way that they can continue to play together, as discussed above.

Accordingly, system software 112 may include a multigame party module 114 that may be configured to manage a multiplayer experience for a plurality of peers. In particular, multigame party module 114 may be configured to create a party session 116 for a plurality of peers that may exist even when the plurality of peers switch between different types of media content such as different multiplayer game software applications. The party session 116 may be created by a party session leader. During creation of party session 116, the party leader may select peers to be sent a request to join the party session 116. In some cases, the party leader may search for peers to invite to the party session on an online community. In some cases, the party leader may select peers from a list of friends to invite to the party session. The party session 116 may include as little as two members and may grow to a predetermined capacity (e.g., 64 members, or more).

In some cases, a party session may not be filled to capacity with members. Accordingly, multigame party module 114 may be configured to send an announcement 140 for party session 116 to an online community server 130. The announcement may include an indication of whether or not the party session is filled to a predetermined capacity of members. When the party session is not full, the announcement may be displayed by the online community server to invite peers to join the party session. When the party session is full, the online community server may be updated to indicate that the party session is full. Further, the announcement may include the identification of each member of the party session. The identification of each party session member may be displayed by the online community server even when the party session is full so that peers may track other peers and view the party sessions that they have joined.

The online community server 130 may include a user interface (UI) that displays a variety of channels 132 that facilitate media content and/or peer interaction. One of channels 132 may be a party channel 134 that may display a list of friend's party sessions 136 and a list of available party sessions 138. The party channel UI 134 will be discussed in further detail below with reference to FIG. 3. The list of available party sessions 138 may be viewed by peers interested in joining a party session. The party session announcement 140 may be posted in the list of available party sessions 138 to invite peers to join the party session. The announcement may be posted in the list of available party sessions until the party session reaches capacity (or the party leader marks the party session as unavailable).

The multigame party module 114 may be configured to establish a p2p connection between computing device 102 and a peer computing device (e.g., peer computing device 1) of a remote peer in response to receiving a request from the remote peer to join the party session. Correspondingly, a p2p connection may be established between each computing device of each member of the party session. Note, multigame party module 114 may be configured to enable two or more peers to join a party session via the same computing device. That is, a party session may include a plurality of members, some of whom are local and others of whom are remote.

The party session 116 may be hosted by multigame party module 114 and may exist outside of any given multiplayer game software application. As such, the p2p connection may selectively include a game connection 120 for one or more members of the party session that are playing in game session. In a case where no members of the party session are currently playing in a game session, no members of the party session may have a game connection. In a case where all members of the party session are playing in the same game session, all member of the party session may have a game connection.

In some embodiments, the p2p connection may include a voice connection 118 that may be established between the computing device and a peer computing device of a remote peer in response to receiving a request from the remote peer to join the party session. The voice connection 118 may allow the members of party session 116 to communicate with each other regardless of the media content they are interacting with. For example, a party session member that is playing a first multiplayer game may chat with other party session members that are playing the first multiplayer game as well as party session members that are interacting with a different type of media content, such as watching a video.

The multigame party module 114 may be configured to place one or more selected party session members into a first game session of a first multiplayer game software application. In some embodiments, a game session may be initiated by the leader of the party session. In such embodiments, the multigame party module may be configured to send and invitation for the first game session to every other party session member. In some embodiments, the members of the party session may vote to play a particular multiplayer game, and the results of the vote may dictate the multiplayer game for which a game session is to be initiated. In some embodiments, the multigame party module 114 may be configured to enable one or more party session members that are not selected members to interact with media content different than the first multiplayer game software application. For example, party session members that are not selected for a game session may listen to music or watch a video while waiting for availability in a game session. This feature may cause a party session member to be engaged in the party session for a longer period of time than the party session member would otherwise be engaged in the party session.

Further, in some embodiments, the party session members selected for the game session may include party session members that opt-in to an invitation to join the game session. In some embodiments, where a game may allow a number of players to play in the game session that is less than the number of party session members, the selected members may be selected using heuristics to assign different game session priority levels to party session members. For example, members who sat out the previous game session may be assigned a higher priority over members that have played more recently. As another example, member may be selected in the order in which they respond to an invitation to join the game session. Further still, in some embodiments, the party session members selected for the game session may include one or more party session members selected by the party session leader.

Upon initiation of a second game session for a second multiplayer game software application, the multigame party module 114 may be configured migrate one or more selected party session members into the second game session. In some cases, selected party session members may be migrated from the first game session of the first multiplayer game software application. In some cases, selected part session members may be migrated from interacting with other media content. This feature permits party session members to move to different multiplayer games sessions in an automated fashion without having to manually gather the party session member each time a new game session is created for a different multiplayer game software application. Such a feature may save time and effort which may keep party session members engaged for longer periods of time.

In some embodiments, an invitation application programming interface (API) 124 may permit an invitation for a game session to be sent to the one or more selected members by a party session leader (or another party session member) from within the multiplayer game software application. In particular, the multigame party module may receive an invitation notice for a game session from a multiplayer game software application via the invitation API. In response to receiving the invitation notice, the multigame party module may send an invitation for the game session to one or more selected members of the party session. This may permit party session members to switch game sessions quickly. In some cases, invitation API 124 may enable an invitation to be sent responsive to control of an in game button for an even easier transition between game sessions.

The multigame party module 114 may be configured to generate a party session management user interface (UI) 122 that includes party session leader controls that adjust party session settings and party session member controls that adjust personal settings. The party session management UI 122 will be discussed in further detail below with reference to FIG. 2.

Figure 2:
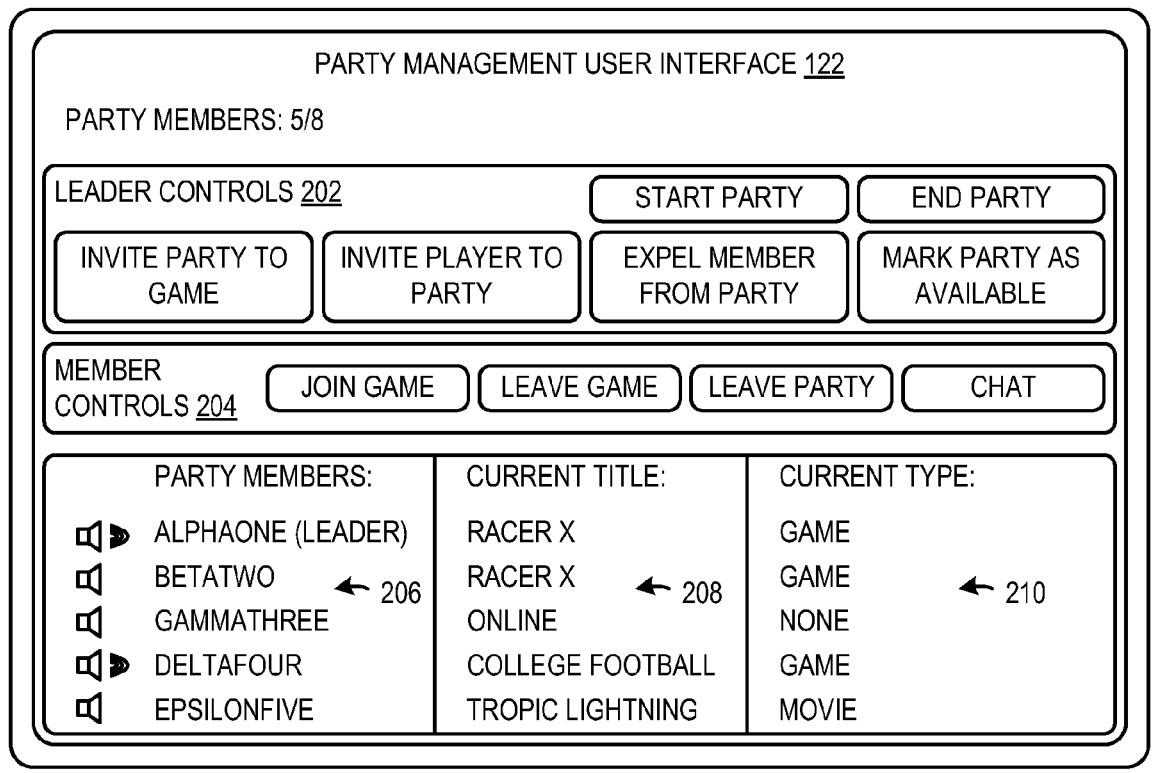
FIG. 2 is an embodiment of a party session management graphical user interface of the computing system of FIG. 1.

FIG. 2 shows an embodiment of party session management UI 122. The party session management UI 122 may be a graphical user interface displayed on display subsystem 108 of computing system 100. The party session management UI 122 may display a total number of party session members and a predetermined capacity for the party session. The party session management UI 122 may include party session leader controls 202 that may permit a party leader to adjust settings of the party session. In particular, party session leader controls 202 may include selectors having functionality to start a party session, end a party session, invite a peer to a party session, invite one or more party session members to a game session, expel a party session member from a party session, and mark a party session as available to join. The party session management UI 122 may include party session member controls 204 that permit a party session member to adjust personal settings. In particular, party session member controls 204 may include selectors having functionality to join a game session, leave a session game, leave a party session, and chat with party session members.

Furthermore, party session management UI 122 may include a list of party session member user identifications (e.g., gamer tags) 206. The list of party session member user identifications 206 may include communication indicators to indicate which party session members are currently chatting. The party session management UI 122 may include a list of current media titles 208 that each party session member is currently interacting with. The party session management UI 122 may include a list of current media types 210 that correspond to each title. These lists may enable a party session member to view what titles are being interacted with so that the party session member may decide to join a given game session when applicable.

Figure 3:
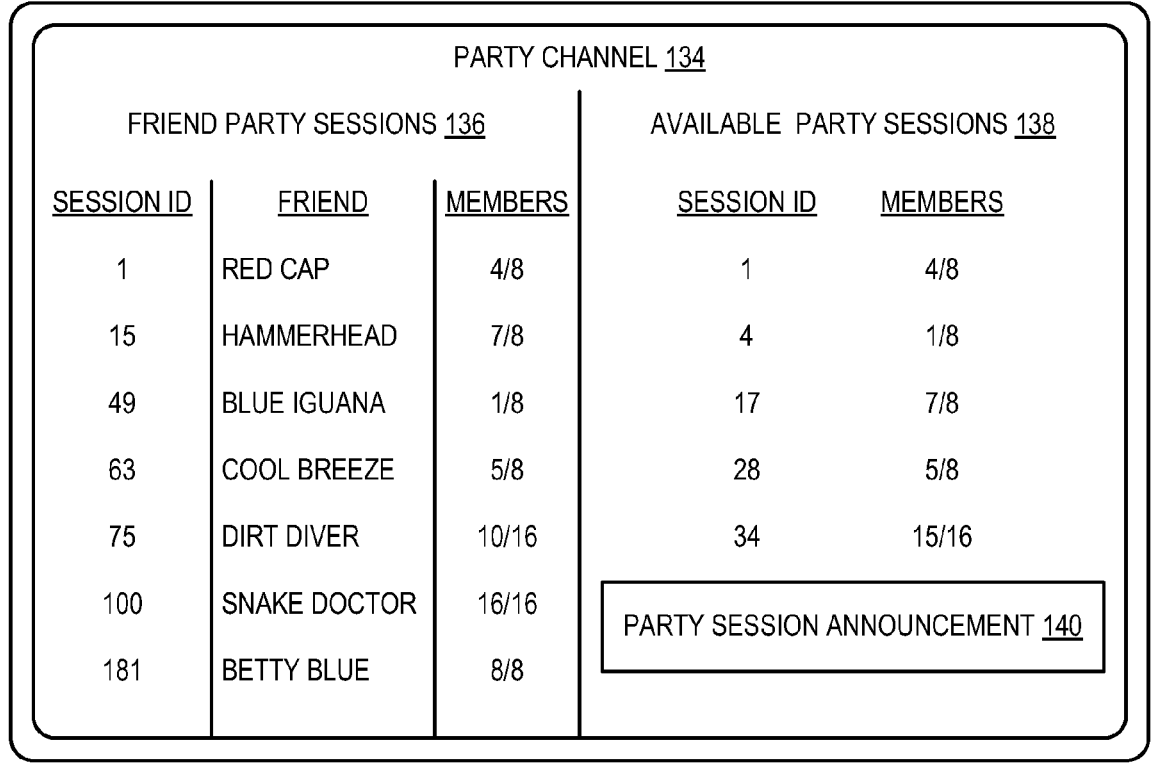
FIG. 3 is an embodiment of a party channel graphical user interface of the computing system of FIG. 1, in which a party session announcement may be displayed.

FIG. 3 is an embodiment of a party channel UI 134. A peer interested in joining a party session may navigate to the party channel UI 134 to join an available party session. In particular, party channel UI 134 may include a list of available party sessions 134 that displays party session identification, a number of party session members, and a capacity of party session members. The party session announcement 140 may be displayed in the list of available party sessions 134 so that peers may join the party session in order to bring the party session to full capacity.

Furthermore, party channel UI 134 may display a list of friend's party sessions 136. The party channel UI 134 may be configured for a particular peer so that each peer may view his or her list of friends. This may enable a peer to join a party session of a particular friend that they want to play a game session with. This feature may permit peers to easily connect with friends when it may otherwise be tedious to find them and play in the same game session.

Figure 4:
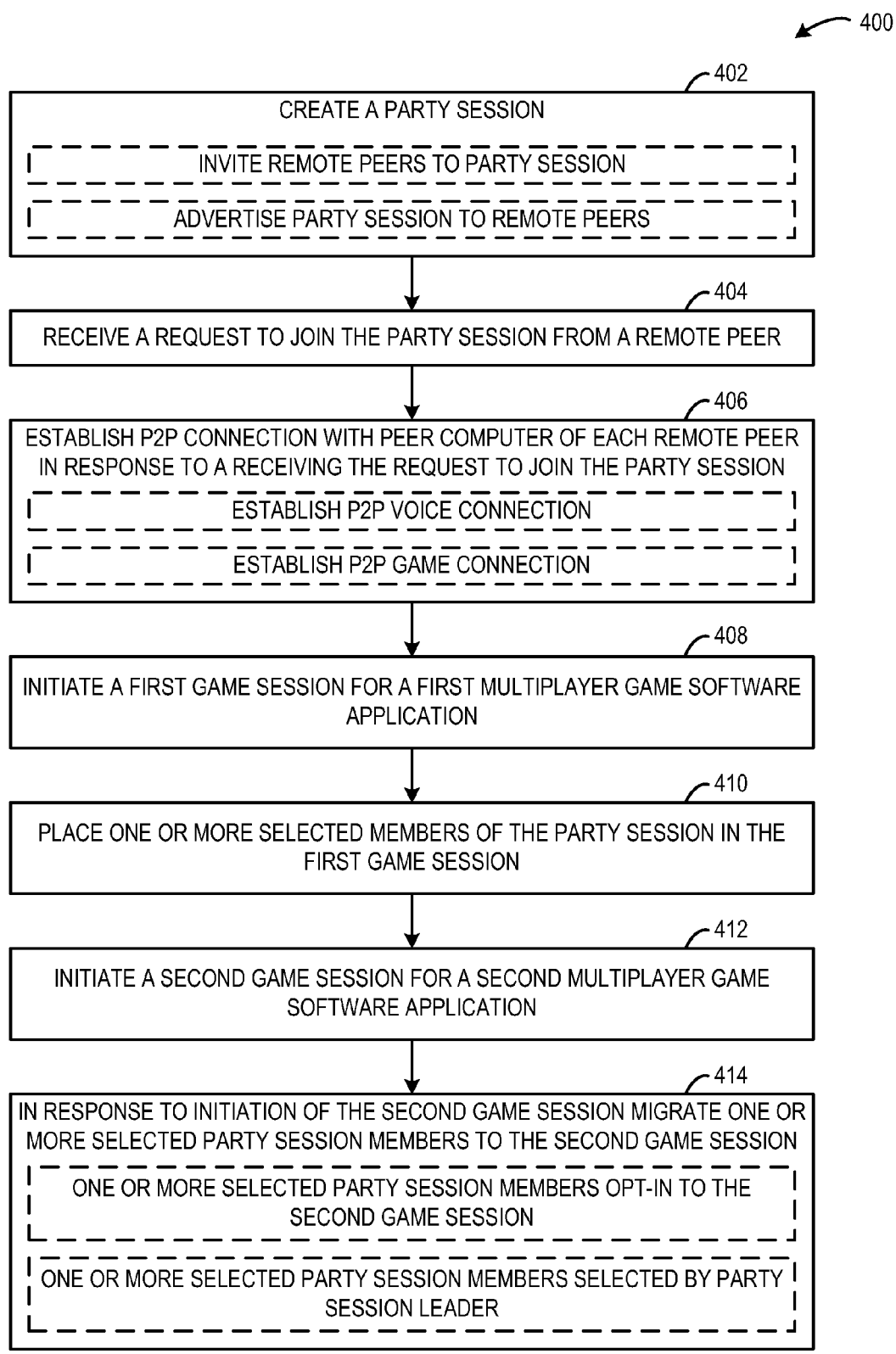
FIG. 4 is a flow diagram of an embodiment of a method for creating a party session.

FIG. 4 shows an embodiment of a method 400 for assembling peers into a party capable of interacting with a plurality of different multiplayer game software applications. The method may begin at 402, where the method typically may include creating a party session. As discussed above with reference to FIG. 1, multigame party module 114 may be configured to create the party session. In some cases, during (or after) creation of the party session, multigame party module 114 may be configured to send invitations to peer computing devices of peers of a party session leader (i.e., the peer creating the party session) to join the party session based on user input to party session management UI 122 by the party session leader. In some cases, during (or after) creation of the party session, multigame party module 114 may be configured to send an announcement based on user input to party session management UI 122 by the party session leader. The multigame party module 114 may send the announcement to an online community to indicate to peers of the online community that the party session is available to join. The announcement may facilitate peers to join the party session as desired by the party leader. In other words, the multigame party module may send a command to the online community to remove the announcement based on user input to the party session management UI by the party leader.

At 404, the method may include receiving a request to join the party session from a remote peer. In particular, the multigame party module of the peer computing device may send the request to the multigame party module of the computing device of the party leader. The request may be sent in response to receiving an invitation to join the party session from the multigame party module of the party leader computing device.

At 406, the method may include establishing a p2p connection between the computing device and a peer computing device of a remote peer in response to receiving a request from the remote peer to join the party session. The multigame party module of the party leader computing device may establish a p2p connection between the party leader computing device and the peer computing device via a p2p connection process. As part (or all) of establishing the p2p connection, the multigame party module may establish a voice connection between the party leader computing device and the peer computing device.

At 408, the method may include initiating a first game session for a first multiplayer game software application. The multigame party module may receive an indication that the first game session has been initiated from the first multiplayer game software application.

At 410, the method may include placing one or more selected party session members in the first game session of the first multiplayer game software application. The multigame party module may establish a game connection for the first game session between the party leader computing device and each peer computing device of the selected party session members. The party session members selected for the first game session may be referred to as a first set of selected party session members. The first set may include one or more party session members. In some cases, the first set may include every party session member.

In some cases, the multigame party module may establish the game connection between the party leader computing device and the peer computing device based on user input by the party leader indicating selection of the selected party session member. In other words, a party session leader may select party members to play in the game session. This case may arise in multiplayer games where the number of players permitted in a game session is less than the number of members in a party session. Further, the multigame party module may be configured to initiate another game session for the first multiplayer game software application to accommodate party session members that were not selected by the party session leader to play in the first game session so that all members of the party session may have the opportunity to play the first multiplayer game software application.

In some cases, the multigame party module may establish the game connection between the party leader computing device and the peer computing device in response to receiving a notice indicating that the selected party session member has opted-in to joining the game session. In other words, a party session member may choose to join the game session instead of being selected by the party leader to join the game session. The game connection for the first game session may permit the selected members of the party session that have opted into the first game session to be collectively placed in the first game session.

At 412, the method may include initiating a second game session for a second multiplayer game software application. For example, the leader of the party session (or another member) may leave the first game session and execute the second multiplayer game software application and start the second game session. The multigame party module may receive an indication that the second game session has been initiated from the second multiplayer game software application.

At 414, the method may include, in response to initiation of the second game session for the second multiplayer game software application, migrating one or more selected party session members to the second game session. The multigame party module may establish a game connection for the second game session between the party leader computing device and each peer computing device of the selected party session members. The game connection for the second game session may permit the selected members of the party session to be collectively placed in the second game session.

The party session members selected for the second game session may be referred to as a second set of selected party session members. In some cases, the first set may include the same party session members as the second set. For example, every member of the multigame party session may play in the first session and then be collectively migrated to the second session by the multigame party module. In some cases, the second set may include different party session members than the first set. For example, one or more members of the party session that did not play the first multiplayer game may choose to play the second multiplayer game. In some cases, one or more party session members may be included in neither the first set nor the second set. For example, a particular party session member may elect to not player the first multiplayer game or the second multiplayer game, but the particular party session member may still choose to be a member of the party session in order to chat with the other party session members via the voice connection.

The above described method may be performed to enable peers to be collectively placed in a games session of a multiplayer game software application as well as migrate between games sessions of different multiplayer game software applications in an efficient, automated manner that is less tedious than prior approaches, and which promotes the proper migration of peers between the game sessions.

It will be appreciated that the above described methods and processes may be executed on a computing system, such as computing system 100, or other suitable computing system. It will also be appreciated that the above described methods may be embodied as instructions stored in data-holding subsystem 106 and executable by logic subsystem 104 of a computing system 100, as illustrated in FIG. 1.

It will be appreciated that the computing devices described herein may be any suitable computing device configured to execute the programs described herein. For example, the computing devices may be a game console, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device for executing multiplayer game software applications playable with one or more remote peers, the computing device comprising:
    a logic subsystem device;
    a multigame party module, executed by the logic subsystem device of the computing device configured to:
        create a party session joinable by the one or more remote peers, the party session being hosted by the multigame party module;
        establish a peer-to-peer connection between the computing device and a peer computing device of a remote peer in response to receiving a request from the remote peer to join the party session;
        place one or more selected party session members into a first game session of a first multiplayer game software application; and
        migrate one or more selected party session members into a second game session for a second multiplayer game software application, thereby moving the one or more selected party session members directly from a first game session for a first multiplayer game software application to a second game session for a second multiplayer game software application in an automated fashion.

2. The computing device of claim 1, wherein the multigame party module is further configured to:
    establish a voice connection between the computing device and the peer computing device of the remote peer in response to receiving the request from the remote peer to join the party session.

3. The computing device of claim 1, wherein the multigame party module is further configured to:
    send an announcement including an indication of whether or not the party session is filled to a predetermined capacity of members to an online community server.

4. The computing device of claim 1, wherein the one or more remote peers join the party session in response to receiving an invitation sent by the multigame party module, the invitation being sent based on user input by a party session leader that controls settings of the party session.

5. The computing device of claim 1, wherein the one or more selected members include party session members that opt-in to an invitation to join the first game session.

6. The computing device of claim 5, wherein the multigame party module sends an invitation for the first game session to the one or more selected members based on receiving an invitation notice from the multiplayer game software application via an application programming interface and/or receiving user input via a party session management user interface to generate an invitation notice.

7. The computing device of claim 1, wherein the one or more selected members include one or more party session members selected by a party session leader that controls party session settings.

8. The computing device of claim 1, wherein the one or more selected members are selected using heuristics to assign different game session priority levels to party session members.

9. The computing device of claim 1, wherein the multigame party module is configured to enable two or more peers to join the party session via the computing device.

10. The computing device of claim 1, wherein the multigame party module is configured to enable one or more party session members that are not selected members to interact with media content different than the first multiplayer game software application.

11. The computing device of claim 1, wherein the multigame party module is configured to generate a party session management user interface including party session leader controls that adjust party session settings and party session member controls that adjust personal settings.

12. The computing device of claim 11, wherein the party leader controls include functionality to start a party session, end a party session, invite a peer to a party session, invite one or more party session members to a game session, expel a party session member from a party session, and mark a party session as available to join.

13. The computing device of claim 11, wherein the party member controls include functionality to join a game session, leave a game session, leave a party session, and chat with party session members.

14. The computing device of claim 11, wherein the party session management user interface further displays a list of party session members, a current media type being executed by a computing device of each party session member, and a title of the current media type.

15. The computing device of claim 11, wherein the multigame party module is further configured to:
    in response to initiation of the first game session, send an invitation for the first game session to every other party session member.

16. A method for assembling peers into a party capable of interacting with a plurality of different multiplayer game software applications, the method comprising:
    creating a party session joinable by one or more remote peers;
    establishing a peer-to-peer connection between a party leader computing device and a peer computing device in response to receiving a request from the peer computing device to join the party session;
    placing a first set of selected party session members into a first game session of a first multiplayer game software application; and
    in response to initiation of a second game session for a second multiplayer game software application, migrating a second set of selected party session members to the second game session, thereby moving the one or more selected party session members directly from a first game session for a first multiplayer game software application to a second game session for a second multiplayer game software application in an automated fashion.

17. The method of claim 16, wherein the second set of selected party session members includes the same party session members that are included in the first set of selected party session members.

18. The method of claim 16, wherein one or more party session members are included in neither the first set nor the second set.

19. A data-holding subsystem device including instructions stored thereon that when executed by a logic subsystem:
- create a party session joinable by one or more remote peers, the party session being hosted by a multigame party module;
- establish a peer-to-peer connection between a party leader computing device and a peer computing device in response to receiving a request from the peer computing device to join the party session;
- place one or more selected party session members into a first game session of a first multiplayer game software application;
- in response to initiation of a second game session for a second multiplayer game software application, migrate one or more selected party session members to the second game session, thereby moving the one or more selected party session members directly from a first game session for a first multiplayer game software application to a second game session for a second multiplayer game software application in an automated fashion; and
- generate a party session management user interface including party session leader controls that adjust party session settings and party session member controls that adjust personal settings.

* * * * *